United States Patent [19]

Dominguez et al.

[11] 4,273,885
[45] Jun. 16, 1981

[54] NOVEL CATALYST SYSTEM FOR RIM ELASTOMERS

[75] Inventors: Richard J. G. Dominguez; Doris M. Rice, both of Austin, Tex.

[73] Assignee: Texaco Development Corp., White Plains, N.Y.

[21] Appl. No.: 136,199

[22] Filed: Apr. 1, 1980

[51] Int. Cl.³ .............................................. C08G 18/14
[52] U.S. Cl. .................................... 521/115; 521/126; 521/127; 521/129
[58] Field of Search ................ 521/115, 126, 127, 129

[56] References Cited

U.S. PATENT DOCUMENTS

| | | | |
|---|---|---|---|
| 3,397,158 | 8/1968 | Britain et al. | 521/127 |
| 4,048,105 | 9/1977 | Salisbury | 521/127 |
| 4,115,321 | 9/1978 | Sandner et al. | 521/127 |
| 4,150,212 | 4/1979 | Meyborg | 521/127 |

Primary Examiner—Maurice J. Welsh
Attorney, Agent, or Firm—Carl G. Ries; Robert A. Kulason; Kenneth R. Priem

[57] ABSTRACT

The invention is a method for making reaction injection molded polyurethane of improved properties. The product comprises the reaction product of a high molecular weight polyhydric polyether, a low molecular weight active hydrogen containing compound of at least two functionality, a polyisocyanate and a catalyst combination comprising a weak tertiary amine, a fast gelation organo tin compound and a delayed action organo tin catalyst. This catalyst combination results in improved processing, a minimum of surface defects and excellent green strength. Reaction injection molded elastomers are useful as molded articles of commerce including, but not limited to, vehicle body parts.

4 Claims, No Drawings

NOVEL CATALYST SYSTEM FOR RIM ELASTOMERS

BACKGROUND OF THE INVENTION

1. Field of the Invention

The invention concerns the field of reaction injection molded polyurethanes.

2. Description of the Prior Art

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. After reaction and demolding, the parts may be subjected to an additional curing step which comprises placing the parts in an ambient temperature of about 250° F. or greater.

It has been surprisingly discovered that significant advantages occur when a particular catalyst combination is used in a RIM formulation.

SUMMARY OF THE INVENTION

The invention is a method for making reaction injection molded polyurethane of improved processing characteristics and properties. The product comprises the reaction product of a high molecular weight polyhydric polyether (polyol), a low molecular weight active hydrogen containing compound of at least 2 functionality, a polyisocyanate and a catalyst combination comprising a weak tertiary amine, a fast gelation organo tin compound and a delayed action organo tin catalyst. The invention is also the resulting RIM polyurethane composition.

DESCRIPTION OF THE PREFERRED EMBODIMENTS

The polyols useful in the RIM elastomers of this invention include polyether polyols, polyester diols, triols, tetrols, etc., having an equivalent weight of at least 500, and preferably at least 1000 up to about 3000. Those polyether polyols based on trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasiprepolymers of polyols and isocyanates are also useful in this invention.

The chain-extenders useful in this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. Other chain-extenders including cyclic diols such as 1,4-cyclohexane diol and ring containing diols such as bishydroxyethylhydroquinone, amide or ester containing diols or amino alcohols, aromatic diamines and aliphatic amines would also be suitable as chain-extenders in the practice of this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

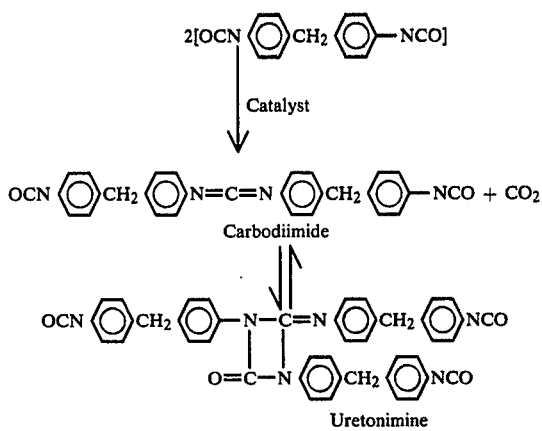

Examples of commerical materials of this type are Upjohn's ISONATE® 125M (pure MDI) and ISONATE® 143L ("liquid" MDI). Preferably the amount of isocyanates used is the stoichiometric amount based on all the ingredients in the formulation or greater than the stoichiometric amount.

It has been surprisingly found that an improvement in processing characteristics of reaction injection molded (RIM) polyurethanes using a combination of ingredients chosen from those enumerated above may be had by employment of a particular catalyst combination. This combination comprises generally a weak tertiary amine catalyst, that is, a tertiary amine which is slow in promoting the polyurethane reaction, a fast gelation organo tin catalyst and a delayed action gelation organo tin catalyst. A delayed action catalyst begins catalytic activity after a period of time has passed after mixing with the reactants. This particular combination of catalyst types results in valuable processing improvements including excellent flow properties in the mold, a minimum of surface defects due to shrinkage and excellent green strength. This has been difficult to achieve by prior art catalyst systems especially in the high flex modulus elastomers (80,000 psi and above). Although several amine and tin catalysts may be used in combination to perform the particular function sought here, it is particularly preferred that the combination of dimorpholinodiethylether be used as the weak tertiary amine catalyst. The fast gelation tin catalyst is preferred to be dibutyltin dilaurate. The delayed action gelation tin catalyst is preferred to be an alkyltin mercaptide. This alkyltin mercaptide may preferably be a commerical product known as FOMREZ® UL-29. Although each individual catalyst in this combination is well known to be a catalyst in the urethane art, the particular combination here provides the advantages of processing and green strength and absence of surface flaws which is absolutely necessary to the successful commercialization of RIM parts.

The RIM formulation includes a great number of other recognized ingredients such as additional crosslinkers, catalysts, extenders, blowing agents and the like. Blowing agents may include halogenated low-boiling hydrocarbons, such as trichloromonofluoromethane and methylene chloride, carbon dioxide, nitrogen, etc., used.

Other conventional formulation ingredients may also be employed, such as, for example, foam stabilizers, also known as silicone oils or emulsifiers. The foam stabilizer may be an organic silane or siloxane. For example, compounds may be used having the formula:

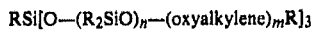

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

In a preferred embodiment of this invention, a high molecular weight polyether polyurethane polyol of about 5000 molecular weight or above is combined with a stoichiometric excess of 4,4'-diphenylmethane diisocyanate (MDI) and allowed to react in the presence of a catalyst combination of dimorpholinodiethylether, dibutyltin dilaurate and an alkyl mercaptide in a standard RIM machine using known processing techniques. In an especially preferred embodiment of this invention the molded RIM part from just above is post cured at a temperature of about 325° F. for about one half of an hour. The invention may be exemplified by the following examples which are not intended to limit the scope of the invention.

A glossary of terms and materials used in the following examples follows the examples.

EXAMPLE I

THANOL® SF-5505 (12.0 pbw), ethylene glycol (6.44 pbw), L-5430 silicone oil (0.2 pbw), THANCAT® DMDEE (0.25 pbw), dibutyltin dilaurate (0.015 pbw), and FOMREZ® UL-29 (0.025 pbw) were premixed and charged into the B-component working tank of an Admiral 40 lb./min. low pressure mechanical mix foam machine. ISONATE® 143L (30.06 pbw) and P-55-0 quasi-prepolymer (5.24 pbw) were premixed and charged into the A-component working tank. The A-component temperature was adjusted to 80° F., and the B-component temperature was adjusted to 120° F. The machine was calibrated to deliver 4750 gm./min. of B-component and 8870 gm./min. of A-component (isocyanate to hydroxyl ratio=1.05). The ingredients were then mixed by a spiral-type mixer turning at 4500 rpms and injected into a 15-in.×15.-in.×0.150-in. steel mold through a gating system which was built into the mold. A 3.2 second shot yielded a flat plaque having an overall density of about 62 pcf. Release time was 45 sec. from pour. After postcuring one-half hour at 325° F. and allowing the sample to equilibrate to ASTM test conditions for one week, the plaque had a flexural modulus of 170,000 psi.

Immediately after release from the mold, the plaque showed little evidence of crazing upon bending, indicating excellent "green strength". The part had an excellent overall appearance, showing no evidence of surface flaws caused by shrinkage.

EXAMPLE II

THANOL SF-5505 (16 pbw), ethylene glycol (6.44 pbw), L-5430 silicone oil (0.2 pbw), THANCAT DMDEE (0.25 pbw), dibutyltin dilaurate (0.015 pbw), and FOMREZ UL-29 (0.025 pbw) were charged into the B-component working tank of a Cincinnati Milacron LRM-2 impingement mix RIM machine. ISONATE 143L (29.0 pbw) and L-55-0 quasi-prepolymer (5.6 pbw) were premixed and charged into the A-component working tank. The A-component temperature was adjusted to 80° F. and the B-component temperature was adjusted to 100° F. The machine was then set to deliver the components at an injection rate of 3 lb/sec and at an isocyanate index of 1.02. The components were then injected at an impingement pressure of approximately 1000 psi into a steel plaque and mold having cavity dimensions of 0.125-in.×24-in.×48-in. The mold temperature was set at 150° F. The parts were released 30 sec. from pour. They had a specific gravity of about 1.1 and after curing ½ hour at 325° F. and equilibrating yielded a flexural modulus of 90,000 psi.

Immediately after release from the mold, the plaques showed no evidence of crazing upon bending, indicating excellent "green strength". The parts had an excellent appearance, showing no evidence of surface flaws caused by shrinkage.

This formulation has been used experimentally by automotive companies to mold fenders with excellent results.

GLOSSARY OF TERMS AND MATERIALS

RIM—Reaction Injection Molding

Polyol—A di or greater functionality high molecular weight alcohol terminated molecule composed of ether groups such as ethylene, propylene, butylene, etc., oxides.

MDI-4,4' diphenyl methane diisocyanate

ISONATE 143L—Pure MDI isocyanate modified so that it is a liquid at temperatures where MDI crystallizes—product of the Upjohn Co.

PAPI 901—A crude form of MDI containing about 30% higher functionality isocyanates and other impurities—product of the Upjohn Co.

Quasi-prepolymer L-55-0—A quasi-prepolymer formed by reacting equal weights of ISONATE 143L and THANOL SF-5505.

Quasi-prepolymer P-55-0—A quasi-prepolymer formed by reacting equal weights of PAPI 901 and THANOL SF-5505.

THANOL SF-5505—a 5500 molecular weight polyether triol containing approximately 80% primary hydroxyl groups.

L5430 Silicone Oil—A silicone glycol copolymer surfactant containing reactive hydroxyl groups. Product of Union Carbide.

THANCAT DMDEE—Dimorpholinodiethylether

FOMREZ UL-29—A stannic diester of a thiol acid (an alkyl tin mercaptide). The exact composition is unknown. Product of Witco Chemical Co.

We claim:

1. In a method for making a polyurethane elastomer of significantly improved properties wherein an aromatic polyisocyanate, a polyol of above about 500 equivalent weight, a chain extending agent comprising a low molecular weight active hydrogen containing compound of at least 2 functionality and a catalyst system is injected via a RIM machine into a mold cavity of the desired configuration the improvement which comprises using as the catalyst system dimorpholinodiethylether, dibutyltin dilaurate and an alkyltin mercaptide.

2. A method as in claim 1 wherein the polyol comprises a polyether of about 5000 molecular weight based on a trihydric initiator.

3. A method as in claim 1 wherein the polyisocyanate comprises 4,4'diphenylmethane diisocyanate.

4. A method as in claim 1 wherein the elastomer is postcured at about 325° F.

* * * * *